United States Patent
Guajardo Merchan et al.

(10) Patent No.: US 9,667,419 B2
(45) Date of Patent: May 30, 2017

(54) SYSTEM AND METHOD FOR CRYPTOGRAPHIC KEY IDENTIFICATION

(71) Applicant: Robert Bosch GmbH, Stuttgart (DE)

(72) Inventors: Jorge Guajardo Merchan, Pittsburgh, PA (US); Heiko Stahl, Reutlingen (DE); Matthew Lewis, Reutlingen (DE); Andreas Mueller, Schwieberdingen (DE); Ralf Schellin, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 14/593,452

(22) Filed: Jan. 9, 2015

(65) Prior Publication Data

US 2015/0200775 A1    Jul. 16, 2015

Related U.S. Application Data

(60) Provisional application No. 61/925,869, filed on Jan. 10, 2014.

(51) Int. Cl.
*H04L 9/08* (2006.01)
*G06N 5/04* (2006.01)

(52) U.S. Cl.
CPC .................. *H04L 9/0866* (2013.01)

(58) Field of Classification Search
CPC ..................................... H04L 9/0866
USPC ............................................ 380/28
See application file for complete search history.

(56) References Cited

U.S. PATENT DOCUMENTS

| | | | | |
|---|---|---|---|---|
| 8,868,923 B1* | 10/2014 | Hamlet | .............. | H04L 9/00 326/8 |
| 2007/0194859 A1* | 8/2007 | Brobston | .............. | H03H 7/40 333/17.3 |
| 2014/0358504 A1* | 12/2014 | Baumstein | .......... | G01V 99/005 703/2 |

* cited by examiner

*Primary Examiner* — Kambiz Zand
*Assistant Examiner* — Aubrey Wyszynski
(74) *Attorney, Agent, or Firm* — Maginot Moore & Beck LLP

(57) ABSTRACT

A method for determining a cryptographic key for a MEMS device includes identifying physical properties for the device. A feature vector having a plurality of values is determined. Each of the values correspond to different physical properties. The cryptographic key is determined from the feature vector. The cryptographic key can be determined using a fuzzy extractor. The cryptographic key can be determined using different feature vectors corresponding to different channels in a device or different MEMS structures in the device.

8 Claims, 7 Drawing Sheets

SYSTEM AND METHOD FOR CRYPTOGRAPHIC KEY IDENTIFICATION

CROSS-REFERENCE TO RELATED APPLICATIONS

This application claims priority to U.S. Provisional application Ser. No. 61/925,869, filed on Jan. 10, 2014, the disclosure of which is herein incorporated by reference in its entirety.

TECHNICAL FIELD

This patent relates generally to the field of information security technology, particularly, to a method for deriving cryptographic key in devices.

BACKGROUND

In general, cryptographic keys are used to maintain security for a device. The cryptographic key can be in the form of unique identifiers to maintain security for the device. In previously known systems, the cryptographic key is stored in a secure storage to maintain the security of the cryptographic key which may not be very secure. To address this issue, methods have been developed to provide a secure way to obtain the cryptographic key such as a Physical Unclonable Functions (PUFs). Some systems use PUFs to derive the cryptographic key from the device based on a single physical property of the device. While deriving the cryptographic key from the device avoids the need to store the cryptographic keys in a secure storage and reduces the cost of manufacturing, these methods can be unpredictable and the output of the method may be uncontrolled. Furthermore, in certain systems that use PUFs, different environmental conditions can provide variable responses and introduce a noise in the determination of the cryptographic key. As such, these systems have to use additional devices such as a fuzzy extractor to address the noise introduced in the measurements. However, these additional devices can increase the overhead by using additional circuitry which can take up more area. As such, improvements in a system and a method that derive a cryptographic key for a device are desirable.

SUMMARY

In order to address this need, a method has been configured to derive a cryptographic key for a device. In one embodiment, the method includes identifying physical properties for the device. A feature vector is determined. The feature vector has a plurality of values that correspond to different physical properties. The cryptographic key for the device is then determined from the feature vector.

In one aspect, if the device comprises two MEMS structures, then physical properties for each device are obtained. A feature vector for each MEMS structure is determined. The cryptographic key for the device is then determined from the feature vectors of each of the MEMS structure.

In another embodiment, a method that enables the derivation of a cryptographic key for a device can include identifying channels of the device if the device can includes more than one channel. A feature vector for each channel is determined. The cryptographic key for the device is then determined from the feature vectors of a portion of the channels.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The disclosure also includes any alterations and modifications to the illustrated embodiments and includes further applications of the principles of the disclosed embodiments as would normally occur to one of ordinary skill in the art to which this patent pertains.

Figure 1:
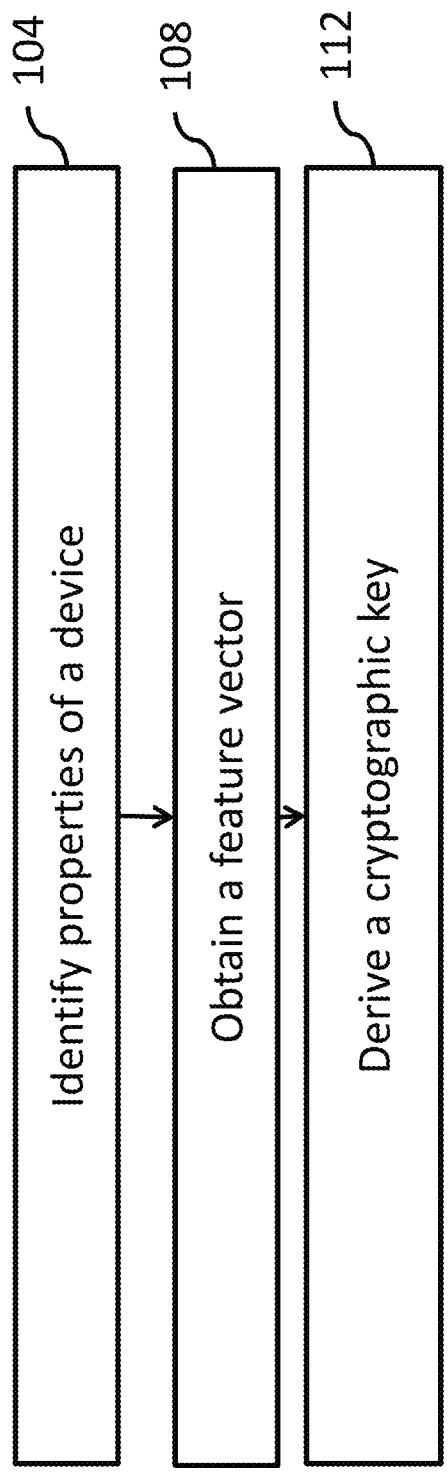
FIG. 1 depicts an exemplary method for determining a cryptographic key for a device.

FIG. 1 depicts an exemplary method for determining a cryptographic key for a device. In the method, properties of the device are identified (Step 104). Examples of properties, such as physical properties of the device that can be measured, include, but are not limited to, a resonant frequency, stiffness of a spring constant with reference to the resonant frequency, a raw offset of the device, a capacitance in the device, a capacitance induced by displacement of the device, a release voltage, a difference in two or more snap voltages, an attenuation value of movement of the device, a resistance in the device, an inductance, a movement curve, an inherent circuit interference, a spectrum pattern, and a voltage applied to a tune test signal to produce a certain voltage, or the like. The capacitances induced by displacement can include the capacitance when the device is in a snap position or the capacitance during maximum deflection of the device. Examples of attenuation values of moving devices include, but are not limited to, spring constants, air pressure, gas pressure, or the like. In one example, the properties can be determined using spectrum filtering. Spectrum patterns can be determined from spectrum analysis by sending an electrical signal into the device and evaluating the spectrum filtered as a result.

A feature vector is obtained whose values correspond to different physical properties of the device (Step 108). The cryptographic key can be derived, determined, generated, or obtained using the feature vector (Step 112). In one example, the cryptographic key can be derived from the feature vector using a fuzzy extractor. Additionally or alternatively, other techniques or devices can be used to derive the cryptographic key from the feature vector.

Additionally, the cryptographic key can be identified using computations on the feature vectors. Examples of computations that can be used include, but are not limited to, a Minkowski distance, a Euclidean distance, correlation, Pearson coefficient computation, a combination of different computations, or the like. It should be understood by the reader that any other computation can be used on the feature vector to derive a cryptographic key. In one example, the computations can assist in determining whether the measurements of the same device are close enough to each other. If the measurements are close enough, techniques such as error correction can be used to correct errors and the same cryptographic key can be recovered or identified from the device. In another example, the computations can also assist in determining whether the obtained fingerprints or the cryptographic key correspond to the same device and as such the derivation of cryptographic key may not be needed.

The exemplary method determines the cryptographic key from the device based on multiple properties and characteristics of the device. As such, the key need not be stored in the device. In one example, the cryptographic key can include, but is not limited to, a security key, a fingerprint of the device, or the like. Examples of the device include, but are not limited to, sensors, such as a microelectromechanical systems (MEMS) sensors, electrical components, or the like. Examples of MEMS sensors include, but are not limited to, accelerometers, gyroscopes, or the like. In another example, the method can further perform another cryptographic function after determining the cryptographic key of the device or determining a cryptographic key for individual components in a device. The cryptographic function includes, but is not limited to, a hash function, a symmetric encryption, an asymmetric encryption, a signature algorithm, or the like.

Figure 2:
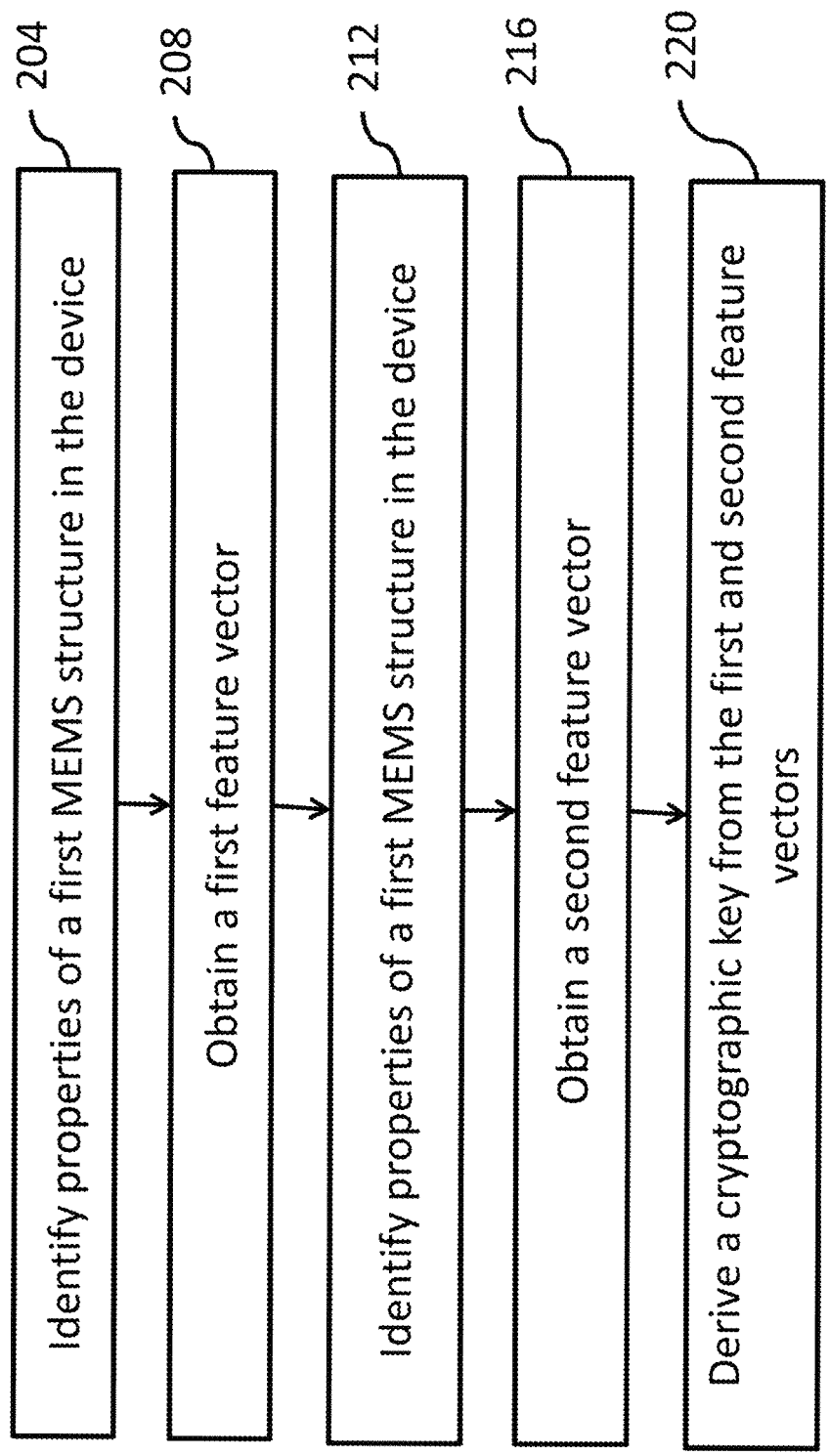
FIG. 2 depicts another exemplary method for determining a cryptographic key for a device.

FIG. 2 depicts another exemplary method for determining a cryptographic key for a device. The device can include one or more components or structures. For example, the device can include a main sensor and other additional components. The main sensor in the device can also include multiple-sensors. Examples of the structures include, but are not limited to, sensors, electrical components such as MEMS structure or sensor, fuzzy extractor, non-volatile memory, or the like. In the exemplary method illustrated in FIG. 2, the device includes two MEMS structures. In the method, properties of the first MEMS structure are identified (Step 204). A first feature vector for the first MEMS structure is then obtained that includes a plurality of values corresponding to different physical properties of the first MEMS structure (Step 208). Properties of the second MEMS structure are also identified (Step 212), and a second feature vector for the second MEMS structure is then obtained that includes a plurality of values corresponding to different physical properties of the second MEMS structure (Step 216). The cryptographic key can be derived using the first feature vector and the second feature vector (Step 220).

Additionally or alternatively, if the device contains multiple channels or the components of the device contain multiple channels, the cryptographic key can be derived from the feature vectors using a portion of the channels. For example, a subset of all the channels can be used to derive the cryptographic key or all of the channels can be used to derive the cryptographic key. In one example, some of the channels can be configured for standard device applications or standard component applications such as determining acceleration and direction while other channels can be reserved for security applications such as generating cryptographic key. As such, the cryptographic key can be derived from feature vectors of a portion of the channels configured for security applications or a combination of channels configured for security applications and standard device applications.

In one example, the cryptographic key can be derived from the feature vectors using a fuzzy extractor. In another example, the cryptographic key can be derived using a comparison, such as a pair-wise comparison, of the feature vectors from a portion of the channels. For example, the comparison of the feature vectors can be used to derive a single bit. Error correction techniques can be then used on the single bit to correct any errors. The single bit can then be used to generate the cryptographic key.

Additionally, a comparison or a pair-wise comparison of the feature vectors can also be used to identify the cryptographic key. Computations such as distance computations can also be used to identify the cryptographic key. Examples of distance computations include, but are not limited to, a Minkowski distance computation, an Euclidean distance computation, or the like. The Minkowski distance can be calculated using, for example, the following Equation:

$$d(v_i, v_j) = \left( \sum_k (v_{ik} - v_{jk})^p \right)^{1/p} \qquad (1)$$

Where, $v_i$ represents the first feature vector and the first feature vector consists of a number of physical property values $$v_i = (v_{i1}, v_{i2}, \ldots, v_{in})$$

for an integer n, $v_j$ represents the second feature vector and the second feature vector consists of a number of physical property values for an integer m, $v_{ik}$ represents a value k out of n number of physical property values for the first feature vector, $v_{jk}$ represents a value k out of m number of physical property values for the second feature vector, and p represents an order p between different values. The Euclidean distance can be calculated with p=2 in Equation (1). It should be understood that other values of p can be substituted in to Equation (1). It should also be understood that other measurements using the physical properties of the device, instead of distance measurements, can also be calculated to determine the cryptographic key for the device.

Figure 3:
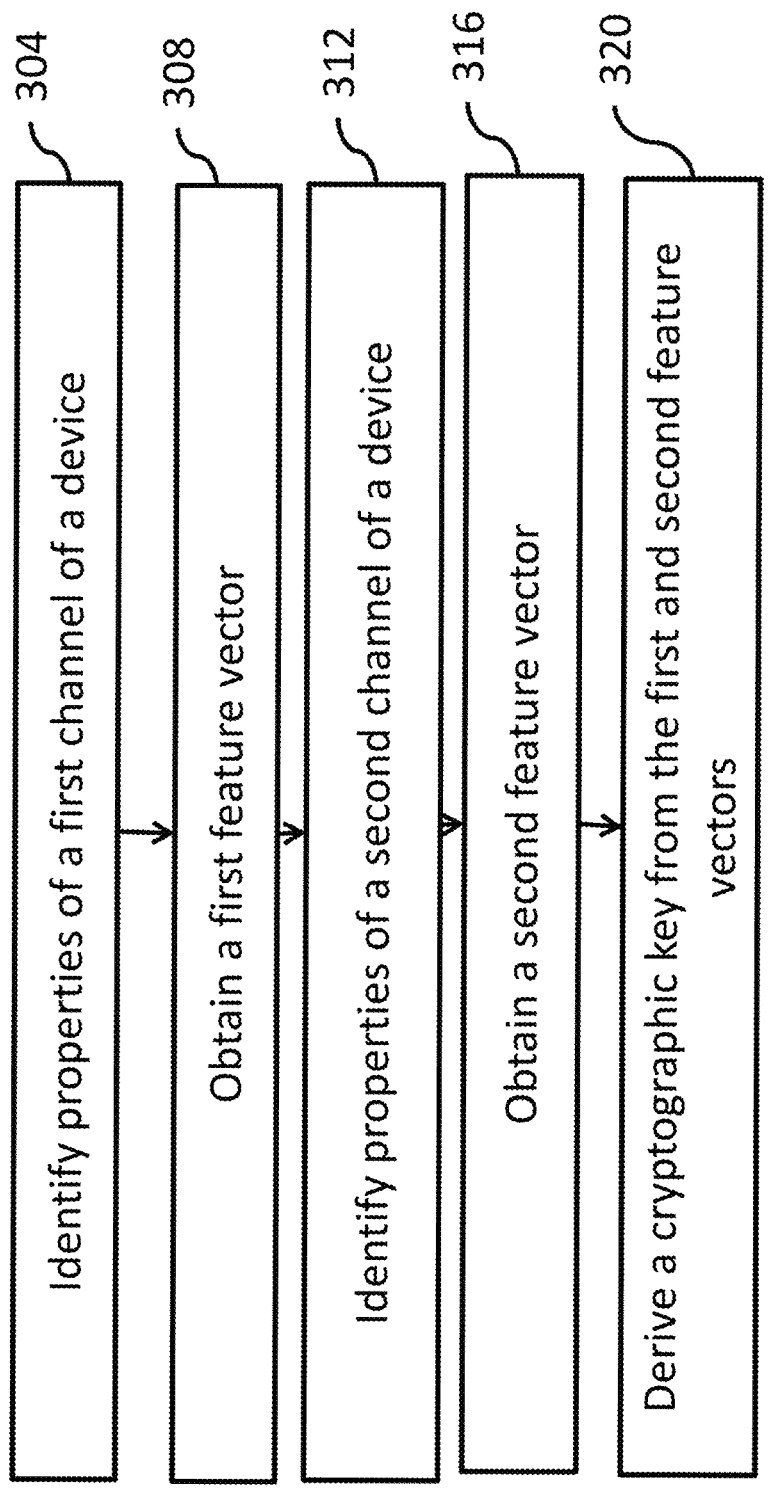
FIG. 3 depicts another exemplary method for determining a cryptographic key for a device.

FIG. 3 depicts another exemplary method for determining a cryptographic key for a device. The device, such as an accelerometer, can include different channels. This exemplary method uses the physical properties for a portion of the channels to derive a cryptographic key for the device. In the method, properties of the first channel are identified (Step 304). A first feature vector for the first channel is then obtained that includes a plurality of values corresponding to different physical properties of the first channel (Step 308). Properties of the second channel are also identified (Step 312), and a second feature vector for the second channel is then obtained that includes a plurality of values corresponding to different physical properties of the second channel (Step 316). The cryptographic key can be derived using the first feature vector and the second feature vector (Step 320). It should be understood by the reader that while only two feature vectors have been illustrated in FIG. 3, the cryptographic key can be derived from multiple feature vectors corresponding to different channels in the device. It should also be understood by the reader that the device can comprise of multiple components and some of these components can include multiple channels. As such, a combination of the methods described herein can be used to derive a cryptographic key for the device.

Figure 4:
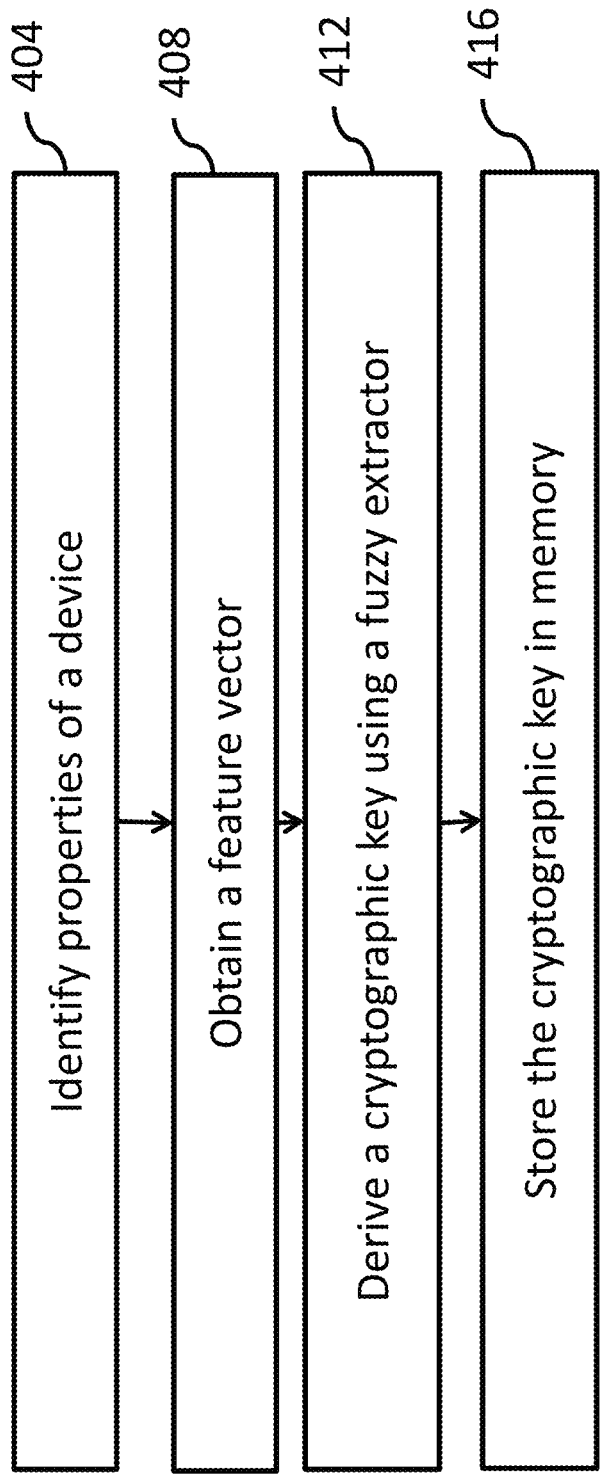
FIG. 4 depicts another exemplary method for determining a cryptographic key for a device.

FIG. 4 depicts another exemplary method for determining a cryptographic key for a device. In the method, physical properties of the device are identified (Step 404). A feature vector is then obtained that includes a plurality of values with each value corresponding to different physical properties of the device (Step 408). The cryptographic key can be derived using the fuzzy extractor and the feature vector (Step 412). In one example, a first key can be derived using the feature vector and the cryptographic key can then be derived using the fuzzy extractor on the first key. Additionally or alternatively, the method can further perform another cryptographic function after determining the cryptographic key of the device or determining a cryptographic key for individual components in a device. The cryptographic function includes, but is not limited to, a hash function, a symmetric encryption, an asymmetric encryption, a signature algorithm, or the like. Additionally, the cryptographic key can be stored in a memory, such as a non-volatile memory (Step 416).

Figure 5:
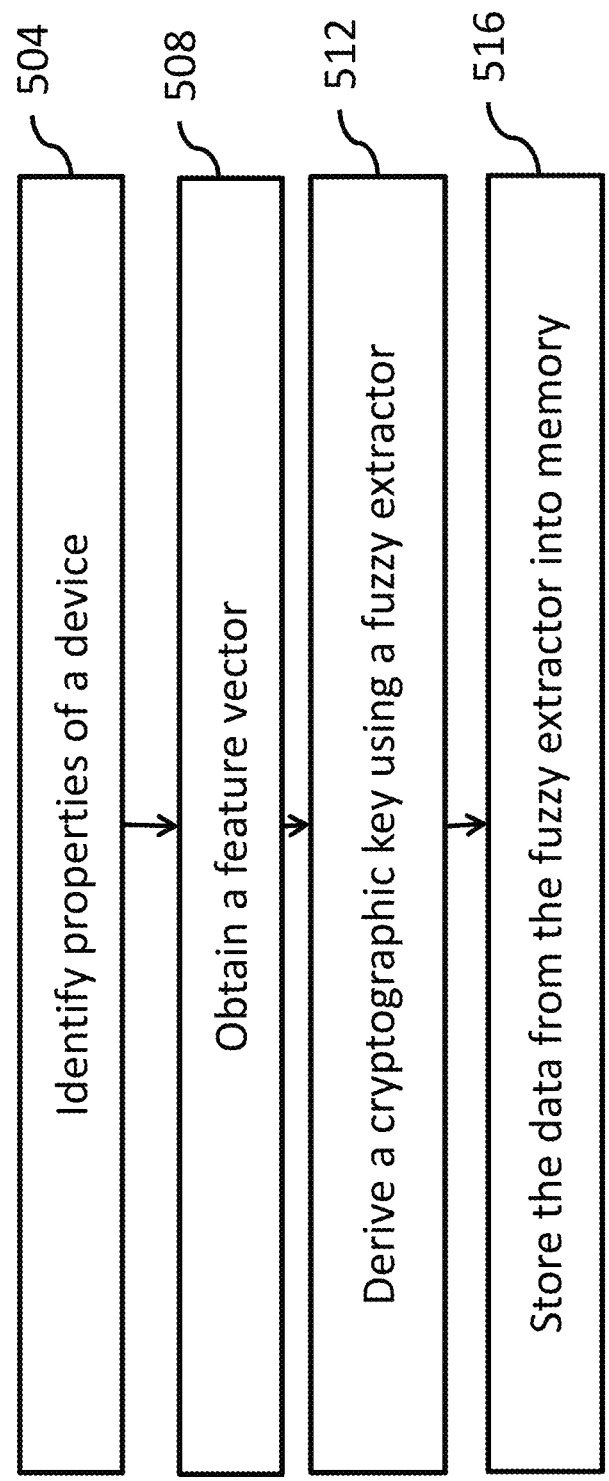
FIG. 5 depicts another exemplary method for determining a cryptographic key for a device.

FIG. 5 depicts another exemplary method for determining a cryptographic key for a device. In the method, physical properties of the device are identified (Step 504). A feature vector is then obtained that includes a plurality of values with each value corresponding to different physical properties of the device (Step 508). The cryptographic key can be derived using the fuzzy extractor and the feature vector (Step 512). The fuzzy extractor can generate data, such as a helper data, to assist with the derivation of the cryptographic key. In one example, a first key can be derived using the feature vector and the cryptographic key can then be derived using the fuzzy extractor on the first key. Additionally or alternatively, the method can further perform another cryptographic function after determining the cryptographic key of the device or determining a cryptographic key for individual components in a device. The cryptographic function includes, but is not limited to, a hash function, a symmetric encryption, an asymmetric encryption, a signature algorithm, or the like. Additionally, the data from the fuzzy extractor can be stored in a memory, such as a non-volatile memory (Step 516). The memory can also store additional data from other devices or techniques used to generate the cryptographic key.

EXAMPLES

Figure 6:
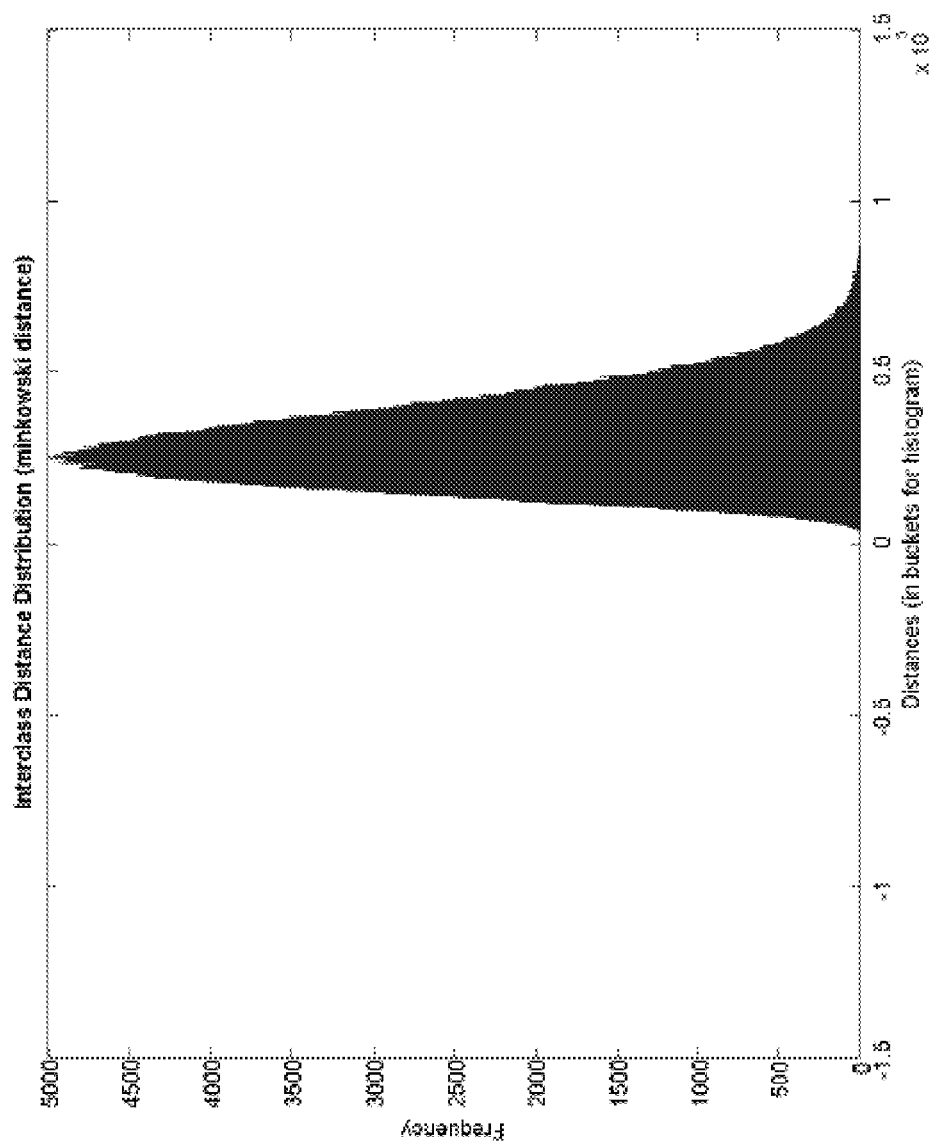
FIG. 6 depicts a graph of the distance measurements during the identification of a key for a MEMS sensor.

FIG. 6 illustrates a graph of the distance measurements during the identification of a cryptographic key for a MEMS sensor device using the exemplary method illustrated in FIG. 1. As illustrated in FIG. 6, the graph depicts an interclass distance distribution using Minkowski distances with the frequency on the x-axis and distance measurements in the y-axis.

Figure 7:
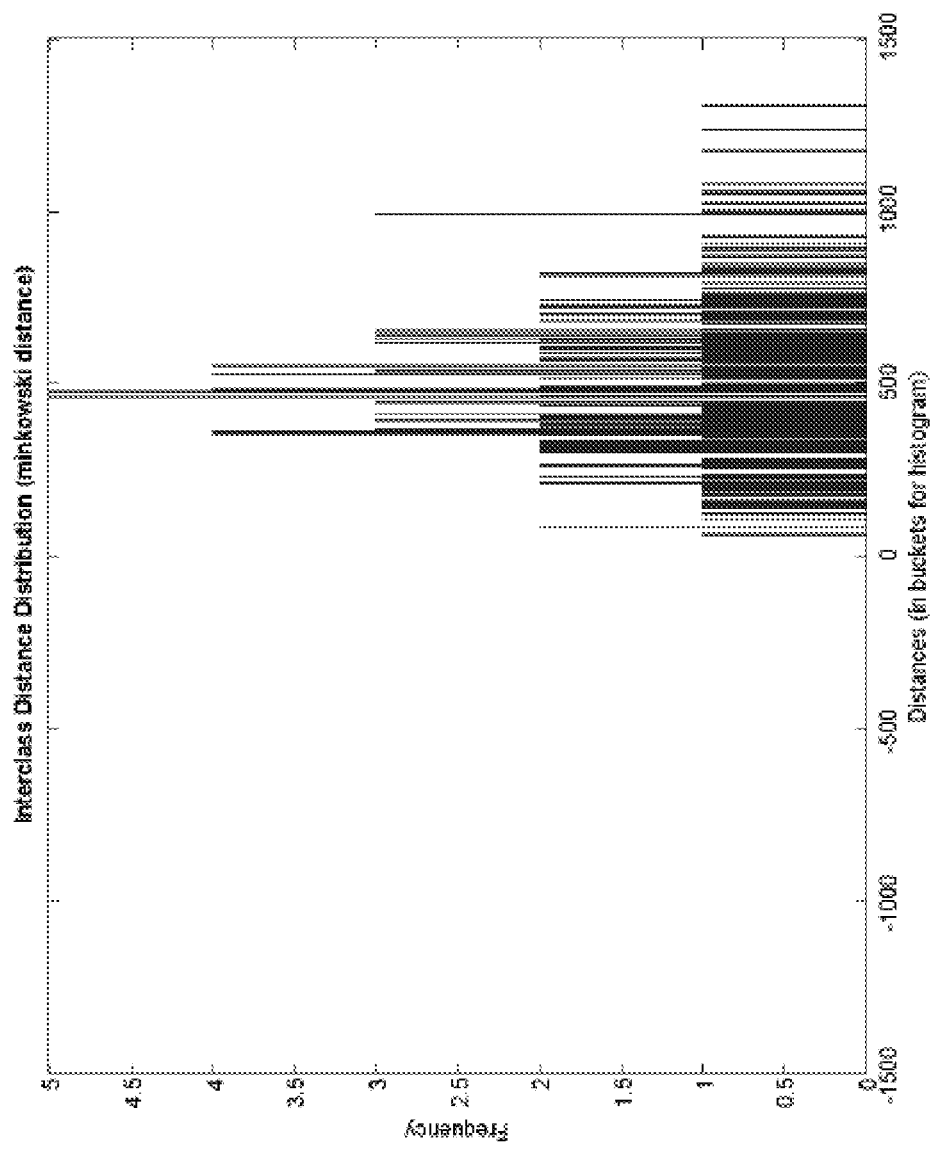
FIG. 7 depicts another graph of the distance measurements during the identification of a key for a MEMS sensor.

FIG. 7 illustrates another graph of the distance measurements during the identification of a cryptographic key for a MEMS sensor device using the exemplary method illustrated in FIG. 1. As illustrated in FIG. 7, the graph depicts an interclass distance distribution using Minkowski distances with the frequency on the x-axis and distance measurements in buckets for histogram in the y-axis. As seen in FIG. 6 and FIG. 7, the scales of the graphs illustrate that it is possible to differentiate between measurements of the same device and from different devices. In this example, measurements from different MEMS sensor devices were around $10^5$ range, while the measurements from the same MEMS sensor device were in the $10^3$ range.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by one of ordinary skill in the art that are also intended to be encompassed by the following embodiments.

What is claimed is:

1. A method for deriving a cryptographic key for a microelectromechanical sensor (MEMS) device, comprising:
   determining a first feature vector for a first MEMS device, the first feature vector having a first plurality of values, each of the values in the first plurality corresponding to a first measurement, respectively, of a plurality of different physical properties of the first MEMS device;
   determining a second feature vector having a second plurality of values, each of the values in the second plurality corresponding to a second measurement, respectively, of the plurality of different physical properties of the first MEMS device or to a first measurement, respectively, of the plurality of different physical properties of a second MEMS device; and
   deriving the cryptographic key from the first feature vector and the second feature vector using a processor.

2. The method of claim 1, wherein the plurality of different physical properties of the device comprises a plurality selected from the following: a resonant frequency, a stiffness of a spring constant with reference to the resonant frequency, a raw offset of the device, a capacitance in the device, a release voltage, a difference in two or more snap voltages, an attenuation value of movement of the device, a resistance in the device, an inductance, a movement curve, an inherent circuit interference, a spectrum pattern, and a voltage applied to a test signal.

3. The method of claim 2, further comprising:
   obtaining the capacitance by displacing the device.

4. The method of claim 1, wherein the derivation of the cryptographic key further comprises:
   providing the first feature vector and the second feature vector to a fuzzy extractor; and
   deriving the cryptographic key using the fuzzy extractor.

5. The method of claim 4, further comprising:
   identifying the cryptographic key based on a pair-wise comparison of the first feature vector and the second feature vector.

6. The method of claim 4, further comprising:
   storing data from the fuzzy extractor in a non-volatile memory.

7. The method of claim 1, wherein the derivation of the cryptographic key further comprises:
   performing a comparison of the first feature vector and the second feature vector to generate a single bit;
   performing an error correction computation of the single bit; and
   deriving the cryptographic key based on the single bit.

8. The method of claim 7, wherein the comparison is a pair-wise comparison of the first feature vector and the second feature vector.

* * * * *